United States Patent
Bang

(10) Patent No.: US 7,883,232 B2
(45) Date of Patent: Feb. 8, 2011

(54) LIGHT-EMITTING DIODE BACKLIGHT ASSEMBLY AND LIQUID CRYSTAL DISPLAY DEVICE USING THE SAME

(75) Inventor: Ju-Young Bang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 176 days.

(21) Appl. No.: 11/301,700

(22) Filed: Dec. 13, 2005

(65) Prior Publication Data

US 2006/0193148 A1 Aug. 31, 2006

(30) Foreign Application Priority Data

Feb. 28, 2005 (KR) .......................... 2005-0016574

(51) Int. Cl.
*G02F 1/13357* (2006.01)
*F21V 13/04* (2006.01)

(52) U.S. Cl. ............ 362/97.3; 362/240; 362/245; 362/246; 362/308; 362/329

(58) Field of Classification Search .......... 362/558, 362/561, 800, 555, 227, 257, 612, 245–247, 362/326, 244, 224, 225, 237, 242, 243, 240, 362/241, 308, 309, 329, 304, 613, 97.1, 97.2, 362/97.3, 299, 327, 328, 307
See application file for complete search history.

(56) References Cited

U.S. PATENT DOCUMENTS 5,704,709 A * 1/1998 Zwick et al. ................ 362/304
5,760,849 A * 6/1998 Omae et al. ................... 349/5
6,007,209 A * 12/1999 Pelka ........................... 362/30
6,679,621 B2 * 1/2004 West et al. .................. 362/327
6,870,525 B2 * 3/2005 Kawabata et al. ........... 345/102
6,932,496 B2 * 8/2005 Rizkin et al. ................ 362/299

(Continued)

FOREIGN PATENT DOCUMENTS

CN 1534339 10/2004

(Continued)

OTHER PUBLICATIONS

Search Report dated Mar. 30, 2006 for corresponding United Kingdom Patent Application No. GB0525342.2.

(Continued)

*Primary Examiner*—Alan Cariaso
(74) *Attorney, Agent, or Firm*—Brinks Hofer Gilson & Lione

(57) ABSTRACT

An LCD device includes an LED backlight assembly, a liquid crystal display panel over the LED backlight assembly, a bottom cover covering a rear side of the LED backlight assembly, a reflecting sheet on an inner side of the bottom cover, the reflecting sheet having a plurality of through-holes corresponding to the plurality of LEDs, a main cover enclosing edges of the liquid crystal display panel and the LED backlight assembly, and a top cover covering edges of a front side of the liquid crystal display panel and combined with the main cover. The LED backlight assembly includes a plurality of LED lamps, a diffusion plate spaced apart from the plurality of LED lamps and having a light transmittance within a range of about 50% to about 90%, and a plurality of optical sheets over the diffusion plate.

16 Claims, 5 Drawing Sheets

U.S. PATENT DOCUMENTS

| | | | |
|---|---|---|---|
| 6,972,439 B1* | 12/2005 | Kim et al. .................... 257/98 |
| 7,118,262 B2* | 10/2006 | Negley ...................... 362/555 |
| 7,213,945 B2* | 5/2007 | Yoneda et al. ............. 362/309 |
| 7,349,163 B2* | 3/2008 | Angelini et al. ............ 362/327 |
| 2002/0181111 A1* | 12/2002 | Okabe et al. ................ 359/599 |
| 2003/0128313 A1 | 7/2003 | Kaminsky et al. |
| 2003/0202363 A1 | 10/2003 | Adachi et al. |
| 2003/0214812 A1* | 11/2003 | Bourdelais et al. .......... 362/330 |
| 2004/0218388 A1* | 11/2004 | Suzuki ....................... 362/231 |
| 2004/0228107 A1 | 11/2004 | Lee et al. |
| 2004/0233665 A1* | 11/2004 | West et al. .................. 362/245 |
| 2005/0001537 A1* | 1/2005 | West et al. .................. 313/500 |
| 2005/0047110 A1* | 3/2005 | Huang et al. .................. 362/31 |
| 2005/0135113 A1* | 6/2005 | Wang et al. .................. 362/97 |
| 2006/0018122 A1* | 1/2006 | Negley ....................... 362/326 |

FOREIGN PATENT DOCUMENTS

EP        1 496 488        1/2005

OTHER PUBLICATIONS

Office Action for corresponding Chinese Patent Application Serial No. 2005101350658, dated Nov. 2, 2008.

* cited by examiner

LIGHT-EMITTING DIODE BACKLIGHT ASSEMBLY AND LIQUID CRYSTAL DISPLAY DEVICE USING THE SAME

This application claims the benefit of priority under 35 U.S.C. §119 to Korean Patent Application No. 2005-0016574, filed Feb. 28, 2005, which is hereby incorporated by reference in its entirety.

FIELD OF THE INVENTION

The present invention relates to a liquid crystal display (LCD) device. More particularly, the present invention relates to a light-emitting diode (LED) backlight assembly, a liquid crystal display (LCD) device including the LED backlight assembly, and a method of using the LED backlight assembly to provide a planar light source in an LCD device.

DISCUSSION OF THE RELATED ART

Our information-based society has created a demand for flat panel display (FPD) devices. FPD devices include plasma display panels (PDPs), field emission display (FED) devices, electroluminescent display (ELD) devices, liquid crystal display (LCD) devices, and so on. Since they are small, light-weight and have low power consumption, FPD devices are taking the place of cathode ray tube (CRT) display devices.

Among the various FPD devices, LCD devices are particularly useful in notebook computers and desktop monitors, because they provide excellent resolution, color display and image quality. An LCD device relies on optical anisotropy and polarizability of liquid crystal molecules to produce an image. Liquid crystal molecules are aligned with directional characteristics resulting from their long, thin shapes and are arranged at specified pre-tilt angles. The alignment direction of the liquid crystal molecules can be controlled by applying an electric field to the liquid crystal. Varying an applied electric field influences alignment of the liquid crystal molecules. Because of the optical anisotropy of liquid crystal molecules, refraction of incident light depends on the alignment direction of the liquid crystal molecules. Thus, by properly controlling the applied electric field, a desired image can be produced.

A typical LCD panel includes an upper substrate, a lower substrate facing and a liquid crystal material layer interposed therebetween. An electric field is generated in an LCD panel by applying a voltage to electrodes within the upper and lower substrates, thereby aligning the liquid crystal molecules to display images according to the transmission of light. However, because an LCD device does not emit light, an additional light source is necessary. Accordingly, an LCD device displays images by disposing a backlight assembly at a backside thereof and transmitting light from the backlight assembly.

Typically, the backlight assembly includes a lamp as the light source. The lamp may be a discharge lamp such as a cold cathode fluorescent lamp (CCFL) or an exterior electrode fluorescent lamp (EEFL). Recently, light emitting diode (LED) lamps have been used as the light source. LED lamps do not include poisonous mercury (Hg) and have good color reproducibility. A backlight assembly having LED lamps may be referred to as an LED backlight assembly.

The liquid crystal display panel and backlight assembly may be modularized using mechanical elements to protect against impacts and to minimize loss of light. FIG. 1 is a perspective view depicting an LCD device with an LED backlight assembly according to the related art. In FIG. 1, the LCD device includes a liquid crystal display panel 10, a backlight assembly 20, a main cover 40, a bottom cover 50, and a top cover 60. The backlight assembly 20 is disposed at a rear side of the liquid crystal display panel 10. The main cover 40, a rectangular frame, is disposed between the backlight assembly 20 and the liquid crystal display panel 10. The bottom cover 50 covers a rear side of the backlight assembly 20 and is connected to the main cover 40. The top cover 60 is a rectangular frame, which covers front edges of the liquid crystal display panel 10 and is connected to the main cover 40 and the bottom cover 50.

Bar-type side supports 70 are disposed at opposite ends of a bottom cover 50 along a first direction. Two ends of the bottom cover 50 along a second direction are bent aslant in an upward direction. The bar-type side supports 70 and the bent ends in the bottom cover 50 form a space in which the backlight assembly 20 is disposed.

The backlight assembly 20 includes a plurality of printed circuit boards 22, a plurality of LED lamps 24, a reflecting sheet 26, a transparent window 30, and optical sheets 32. The printed circuit boards 22 are stripe-shaped and are arranged on an inner surface of the bottom cover 50. A plurality of LED lamps 24 is disposed on the printed circuit boards 22. A reflecting sheet 26 covers the plurality of printed circuit boards 22 and the inner surface of the bottom cover 50. The reflecting sheet 26 has a plurality of through-holes 28 corresponding to the plurality of LED lamps 24, whereby the plurality of LED lamps 24 protrude through the plurality of through-holes 28 in the reflecting sheet 26. The transparent window 30 is spaced apart from and faces the plurality of LED lamps 24. The transparent window 30 includes reflecting dots 31 corresponding to the plurality of LED lamps 24. Optical sheets 32 are disposed over the transparent window 30.

The plurality of LED lamps 24 include red, green and blue LED lamps sequentially arranged, whereby red, green and blue lights are combined to form white light. The reflecting dots 31, also referred to as diverters, have circular shapes corresponding to the LED lamps 24, which reflect light together with the reflecting sheet 26. The optical sheets 32 include a prism sheet, a diffusion sheet, and so forth. Light directly emitted from the LED lamps 24 or reflected on the reflecting sheet 26 from the LED lamps 24 is converted to white light as it passes through the transparent window 30 and the optical sheets 32 to the liquid crystal display panel 10. The liquid crystal display panel 10 uses the light to produce bright images.

FIG. 2 is a cross-sectional view illustrating a part of an LCD device including an LED backlight assembly according to the related art and corresponds to a cross-section along the line II-II of FIG. 1. In FIG. 2, light is directly emitted from the LED lamps 24 through the transparent window 30 or it is reflected by reflecting dots 31 on the transparent window 30 back toward the reflecting sheet 26 and then up again through the transparent window 30 or toward the reflecting dots 31. Accordingly, the LED lamps 24 provide a dot light source which is converted to a planar light source as it passes through the optical sheets 32.

There are several problems associated with LCD devices employing an LED backlight assembly according to the related art. First, in spite of the use of reflecting dots 31 and optical sheets 32, it is difficult to achieve uniform light dispersion efficiency. In other words, light emitted from the plurality of LED lamps 24 is not completely converted into planar light. Accordingly, the dot light source in LED lamps 24 may affect the way that images are displayed by the liquid crystal display panel 10. For example, the displayed images may become stained or they may exhibit non-uniform brightness.

By narrowing the distance between reflecting dots 31 in the transparent window 30 and their corresponding LED lamps 24, more uniform brightness can be achieved. Thus, the distance between the transparent window 30 and the LED lamps 24 is kept less than about 3 mm. However, if the transparent window 30 and the LED lamps 24 are too close, they may crash into each other and break when outer stresses, such as impact or vibration are applied.

Furthermore, as the transparent window 30 approach the LED lamps 24, the path of red, green and blue light emitted from the LED lamps 24 is shortened, producing a more narrow space for mixing the red, green and blue light. Accordingly, to produce a high quality white light, distances between the LED lamps 24 should be shortened.

SUMMARY OF THE INVENTION

In one aspect of the present invention, an LED backlight assembly includes a plurality of LED lamps, a diffusion plate spaced apart from the plurality of LED lamps, the diffusion plate having a light transmittance within a range of about 50% to about 90%, and a plurality of optical sheets over the diffusion plate.

In another aspect, an LCD device employing an LED backlight assembly according to the present invention is provided. The LED backlight assembly further includes a reflecting sheet having a plurality of through-holes corresponding to the plurality of LED lamps. In addition to the LED backlight assembly, the LCD device includes an LCD panel over the LED backlight assembly, a bottom cover covering a rear side of the LED backlight assembly, and a main cover disposed between the liquid crystal display panel and the LED backlight assembly. A top cover covers the LCD panel and is connected to the main cover. The main cover is connected to the bottom cover forming a space to enclose the backlight assembly to prevent loss of light.

In a further aspect, a method of providing a planar light source to an LCD device includes providing a liquid crystal display device having a liquid crystal display panel with an LED backlight assembly according to the present invention. The backlight assembly includes a plurality of LED lamps, a reflecting sheet having a plurality of through-holes corresponding to the plurality of LED lamps; a diffusion plate spaced apart from the plurality of LED lamps, the diffusion plate having a light transmittance between about 50% and about 90%; and a plurality of optical sheets over the diffusion plate. Light emitted from the LED lamps or reflected from the reflecting sheet is transmitted through the diffusion plate and the plurality of optical sheets to the liquid crystal display panel, such that the transmitted light changes from a dot light source into a planar light source.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Figure 1:
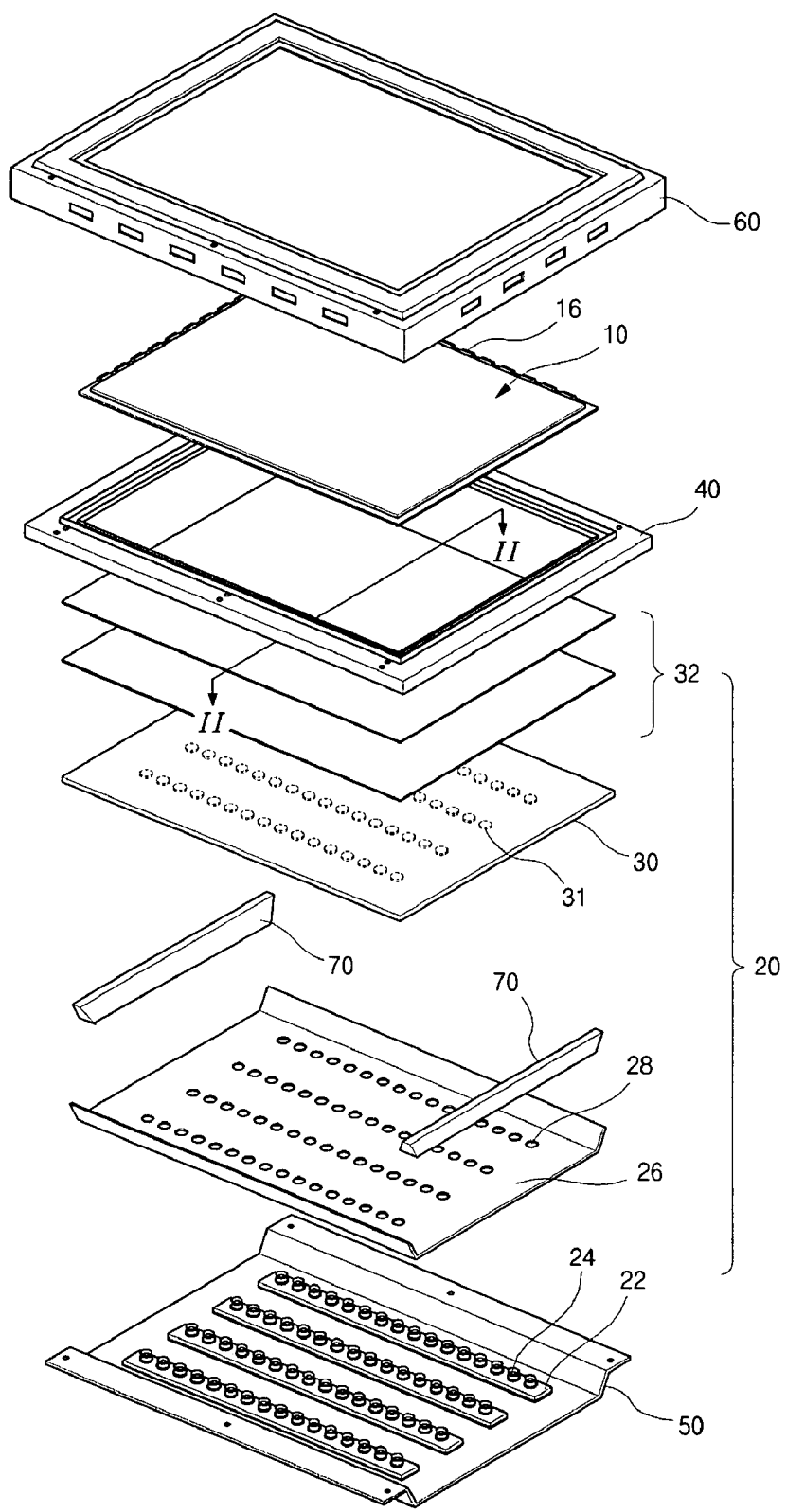
FIG. 1 is a perspective view depicting an LCD device with an LED backlight assembly according to the related art.
Figure 2:
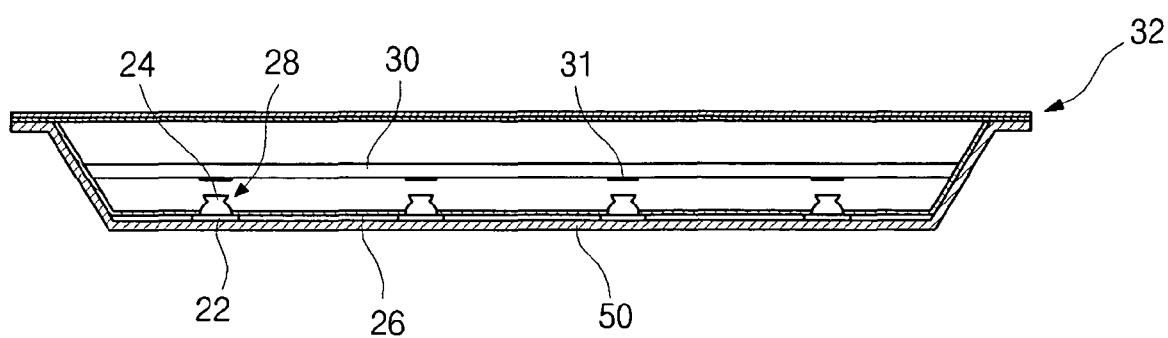
FIG. 2 is a cross-sectional view depicting a part of an LCD device including an LED backlight assembly according to the related art.
Figure 3:
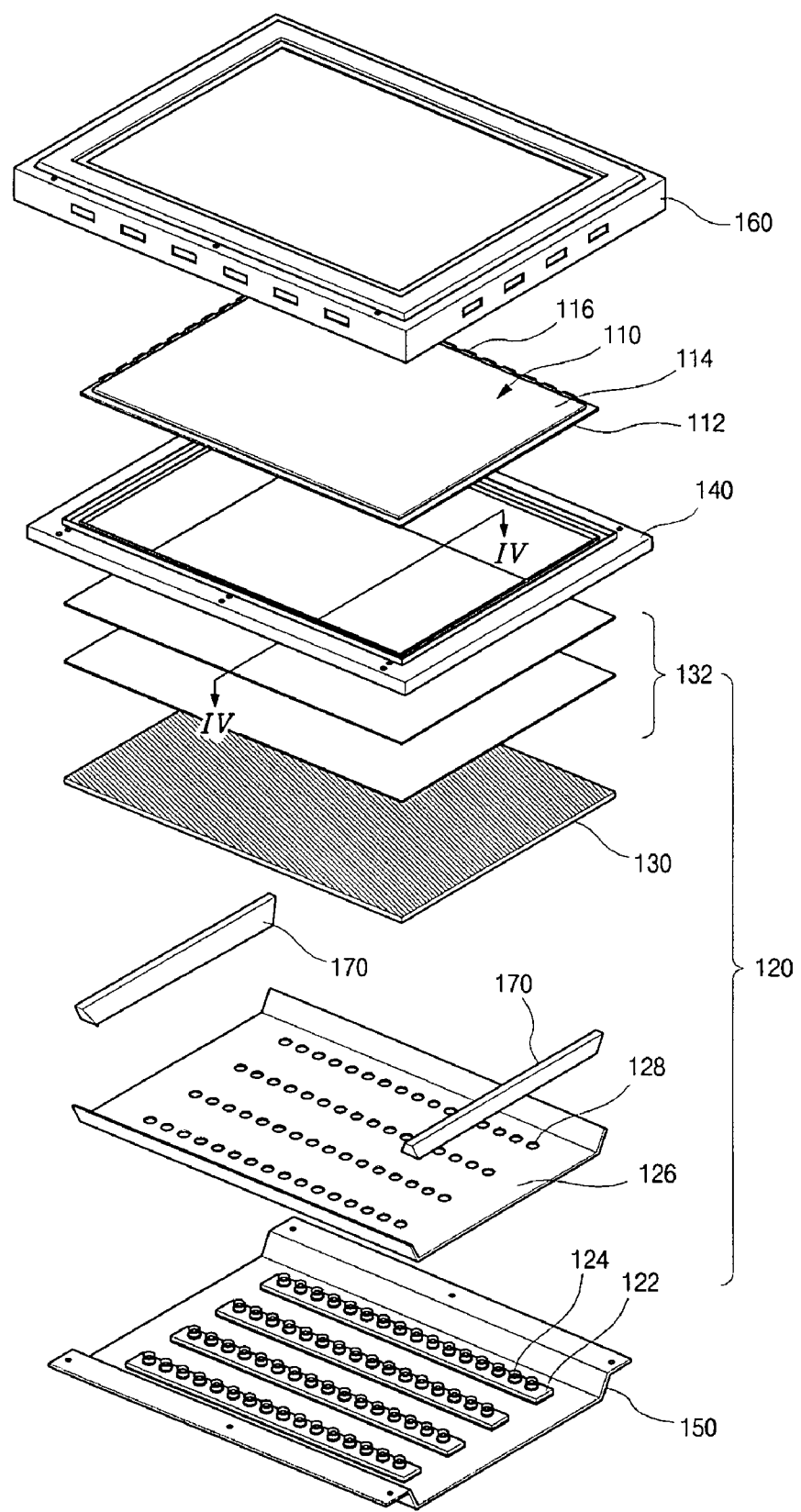
FIG. 3 is a perspective view depicting an LCD device including an LED backlight assembly according to an embodiment of the present invention.

FIG. 3 is a perspective view depicting a liquid crystal display (LCD) device including an LED backlight assembly according to an embodiment of the present invention. In FIG. 3, a backlight assembly 120 is disposed at a rear side of the liquid crystal display panel 110. The main cover 140, a rectangular frame of a resin mold, is disposed between the backlight assembly 120 and the liquid crystal display panel 110. The bottom cover 150 covers and holds the backlight assembly 120 in place. The main cover 140 disposed at the rear side of the liquid crystal display panel 110 is connected to the bottom cover to prevent loss of light. A top cover 160, covering the front side of the liquid crystal display panel 110, is connected to the main cover 140 and the bottom cover 150.

The liquid crystal display panel 110 produces images. The liquid crystal display panel 110 includes first and second substrates 112 and 114 attached to each other with a liquid crystal material layer interposed therebetween. A plurality of gate lines and a plurality of data lines form on an inner surface of the first substrate 112 facing the second substrate 114. The plurality of gate lines and the plurality of data lines cross each other to define a plurality of pixel regions. A transparent pixel electrode is formed in each pixel region. A thin film transistor (TFT) is formed at each crossing point between a gate line and a data line. Each TFT is connected to a transparent pixel electrode. The first substrate 112 including the TFTs and the pixel electrodes is also referred to as the array substrate.

A black matrix and a color filter layer are formed on an inner surface of the second substrate 114 facing the first substrate 112. The color filter layer includes red, green and blue color filters, each color filter corresponding to a pixel region. The black matrix is formed between adjacent color filters and covers the gate and data lines and the TFTs. A common electrode is formed on the black matrix and the color filter. The second substrate 114 including the color filter layer and the common electrode is also referred to as the color filter substrate.

Driving integrated circuits are connected to at least one side of the liquid crystal display panel 110 through conductive connecting means 116. This conductive connecting means 116 may include flexible printed circuit (FPC) boards or tape carrier packages (TCPs). The conductive connecting means 116 are bent toward a side of the main cover 140 or a rear side of the bottom cover 150. The driving integrated circuits include gate-driving integrated circuits and data-driving integrated circuits. The gate-driving integrated circuits provide scanning signals for on/off turning of TFTs through the gate lines. The data-driving integrated circuits provide image signals for each frame through the data lines. The gate-driving integrated circuits and the data-driving integrated circuits may be disposed on adjacent sides of the liquid crystal display panel 110.

In the liquid crystal display panel 110, scanning signals scan the gate lines line by line. When a scanning signal is provided through a selected gate line to turn on a TFT connected thereto, image signals are provided to the pixel electrodes through the data lines and the TFTs. The arrangement of liquid crystal molecules is changed according to changes in light transmittance resulting from variations in an electric field induced between a pixel electrode and the common electrode.

The bottom cover 150 functions as a bottom case to hold the backlight assembly 120. Bar-type side supports 170 are disposed at opposite ends of the bottom cover 150 along a first direction. Opposite ends of the bottom cover 50 along a second direction are bent aslant and raised in an upward direction. Accordingly, the bar-type side supports 170 and the bent ends in the bottom cover 150 define a space in which the backlight assembly 120 is disposed.

The backlight assembly 120 is disposed in this space and provides light to the liquid crystal display panel 110. The backlight assembly 120 uses a plurality of light emitting diode (LED) lamps 124 as a light source. The backlight assembly 120 includes a plurality of printed circuit boards 122, a plurality of LED lamps 124, a reflecting sheet 126, a diffusion plate 130, and a plurality of optical sheets 132.

The printed circuit boards 122 are stripe-shaped and are arranged on an inner surface of the bottom cover 150. LED lamps 124 are arranged in a line on a given printed circuit board 122. A reflecting sheet 126 is disposed over the bottom cover 150. The reflecting sheet 126 covers the plurality of printed circuit boards 122 and an inner surface of the bottom cover 150. The reflecting sheet 126 has a plurality of through-holes 128 corresponding to the plurality of LED lamps 124, whereby the plurality of LED lamps 124 protrude through the plurality of through-holes 128 in the reflecting sheet 126. The reflecting sheet 126 may be white-colored or silver-colored. A diffusion plate 130 is spaced apart from and faces the plurality of LED lamps 124. A plurality of optical sheets 132 is disposed over the diffusion plate 130.

The plurality of LED lamps 124 includes red, green and blue LED lamps sequentially arranged on the printed circuit boards 122, whereby red, green and blue lights are combined to form white light. The plurality of optical sheets 132 includes functional sheets or films, such as a prism sheet, diffusion sheet, or reflective polarization film, also referred to as a dual brightness enhancement film (DBEF). Accordingly, light directly emitted from the LED lamps 124 or reflected on the reflecting sheet 126 thereafter is converted to white light as it passes through the diffusion plate 130 and the optical sheets 132 to the liquid crystal display panel 110. The liquid crystal display panel 110 uses the light to display bright images. In contrast to the related art, the present invention can change a dot light source to a planar light source by using a diffusion plate 130 in place of a transparent window having reflecting dots.

Figure 4:
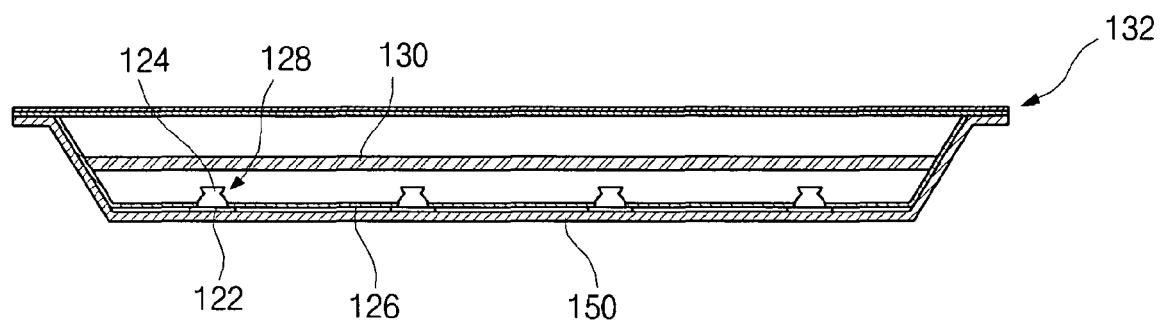
FIG. 4 is a cross-sectional view depicting a part of an LCD device including an LED backlight assembly according to the present invention.

FIG. 4 is a cross-sectional view illustrating a part of an LCD device including an LED backlight assembly according to the present invention, more particularly, the LED backlight assembly, and corresponds to a cross-section along the line IV-IV of FIG. 3. In FIG. 4, light directly emitted from the LED lamps 124 or reflected thereafter by a reflecting sheet 126 is directed to the liquid crystal display panel 110 after sequentially passing through the diffusion plate 130 and the optical sheets 132.

The diffusion plate 130 has light transmittance within a range between about 50% and about 90%. The diffusion plate 130 may be formed by adding dispersing agents when extruding a synthetic resin, such as polymethyl methacrylate (PMMA). The dispersing agents may include particles having reflecting properties, such as aluminum particles. The diffusion plate 130 is spaced apart from the LED lamps 124. Thus, the diffusion plate 130 diffuses dot light sources from the LED lamps 124 and improves the mixing of red, green and blue color lights.

In the present invention, light is diffused through a substantially entire surface of the diffusion plate 130 instead of limited diffusion through reflecting dots. A distance between the diffusion plate 130 and the LED lamps 124 may be more than 3 mm. By increasing the distance between the LED lamps 124 and the diffusion plate 130 as compared to the related art, providing better mixing of the red, green and blue lights. Moreover, the increased spatial difference reduces the possibility of a collision between the diffusion plate 130 and the LED lamps 124 in the event of external stresses producing impact or vibration.

The diffusion plate 130 functions similarly as a diffusion sheet used in an optical sheet 132. However, the diffusion plate 130 is thicker than the diffusion sheet because the diffusion plate 130 is spaced further apart from the LED lamps 124 than an optical sheet 132 according to the related art. Thus, a path of light refracted at an incident plane is extended by the thickness of the diffusion plate 130 and by the spatial distance between the LED lamps 124 and the diffusion plate 130. As a result, better mixing of the colored lights is obtained.

The diffusion plate 130 may be formed by printing or coating dispersing agents on one side or both sides of a transparent window. The transparent window may include PMMA. Accordingly, the diffusion plate 130 used in the LED backlight assembly of the present invention is configured to diffuse light all over the surface, unlike a transparent window in the related art having circular reflecting dots disposed over the LED lamps 124 for reflecting light. Because the diffusion plate 130 is spaced apart from the LED lamps 124 at a distance greater than 3 mm, improved color mixing occurs and a more uniform planar light is obtained. Light diffusing and mixing while passing through the diffusion plate 130 is again diffused through the optical sheets 132. As a result, a more uniform light source is provided to the liquid crystal display panel 110. In this case, the optical sheets 132 may be spaced apart from the diffusion plate 130 at a distance of greater than 10 mm.

Figure 5A:
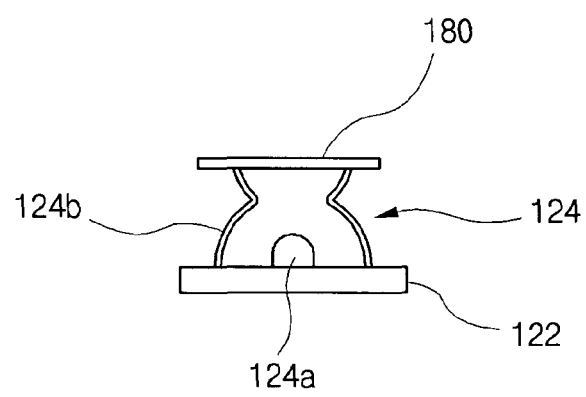
FIGS. 5A to 5C are views depicting an LED lamp according to an embodiment of the present invention.
Figure 5B:
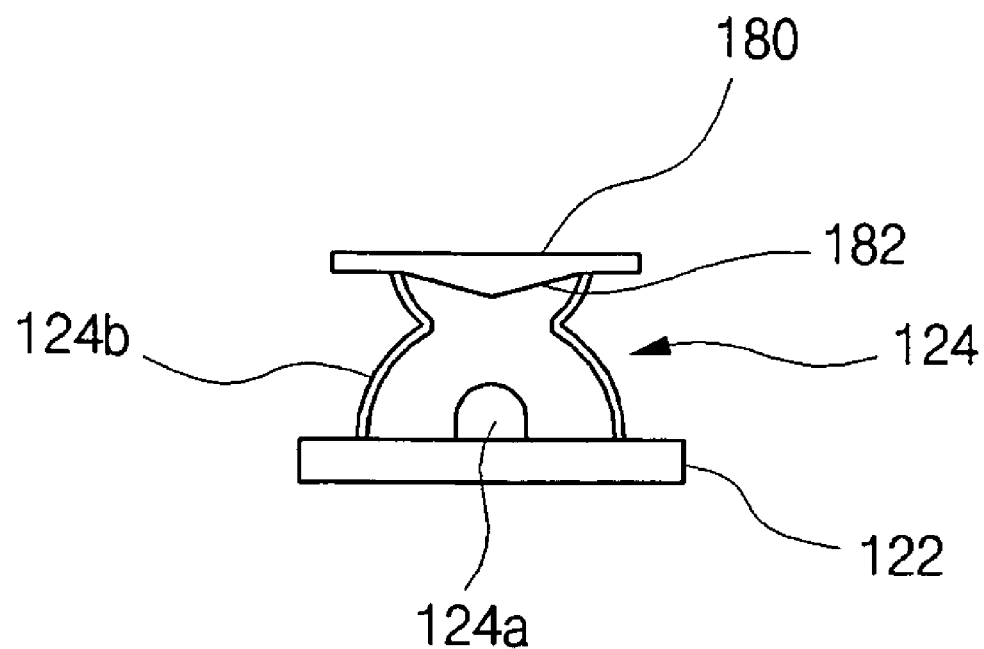
Figure 5C:
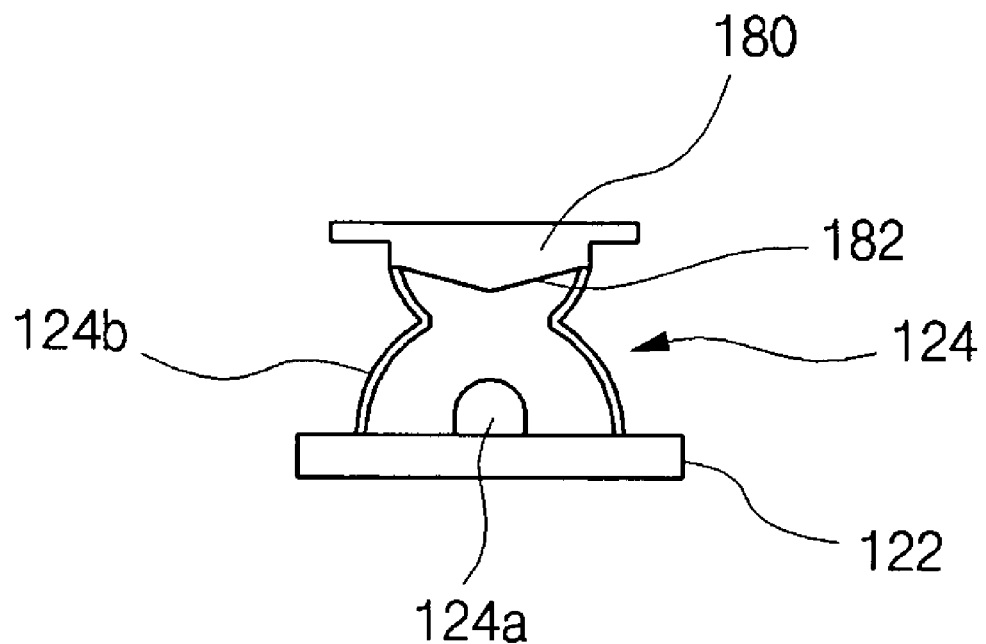

Additional elements may be included to produce a more uniform planar light source. FIGS. 5A to 5C illustrate an LED lamp according to a further embodiment of the present invention. In particular, FIGS. 5A to 5C depict an LED lamp 124, including an LED 124a and an LED lens 124b which can be used in an LED backlight assembly according to the present invention. The LED 124a is set up on a printed circuit board 122. The printed circuit board 122 may be a metal core printed circuit board, which radiates heat. An LED lens 124b surrounds the LED 124a and a front side of the LED lens 124b emitting light is opened. The LED lens 124b exposes an upper part of the LED 124a. The LED lens 124b may be formed of transparent resin painted with a red, green or blue color.

A dot reflecting sheet 180 is attached to the LED lamp 124 and covers the front side of the LED lens 124b. In one embodiment, the dot reflecting sheet 180 is a white-colored or silver-colored sheet reflecting light similarly as the reflecting sheet 126. The dot reflecting sheet 180 reflects light emitted from the LED 124a toward the LED lens 124b and through the LED lens 124b. Accordingly, the colored lights are mixed better, so as to provide a more uniform planar light source. To increase reflective efficiency, a mirror may be formed at a lower side of the dot reflecting sheet 180, i.e., a side facing the LED 124a.

The lower side of the dot reflecting sheet 180 may have a flat surface as shown in FIG. 5A. The lower side of the dot reflecting sheet 180 may structured to increase the amount of light passing through the LED lens 124b. For example, in FIG. 5B, the lower side of the dot reflecting sheet 180 is depicted as a peaked part 182, which may be formed within the opened front side of the LED lens 124b. In FIG. 5C, the peaked part 182 is spaced further from the upper side of the dot reflecting sheet 180 in comparison to FIG. 5B.

The peaked part 182 reflects light emitted from the LED 124a toward the dot reflecting sheet 180, changing a path of light toward the LED lens 124b. The peaked part 182 may have other shapes. For example, both sides of the peaked part 182 may be curved.

The LED backlight assembly of the present invention converts dot light sources from LED lamps into a more uniform planar light source. Since, in the present invention the diffusion plate is substituted for a transparent window having circular reflecting dots, diffusion and mixing of light is improved, resulting in more uniform brightness and better quality image display. Further, since the LED lamps may be arranged further away from the diffusion sheet, there is a reduced possibility of the LED lamps colliding with the diffusion plate when external stresses are applied.

It will be apparent to those skilled in the art that various modifications and variations can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. An LED backlight assembly, comprising:
   a plurality of LED lamps;
   respective LED lamps including an LED surrounded by an LED lens, the LED lens having an open portion at a distal end thereof;
   a dot reflecting sheet including a plate part and a peaked part at a side facing the LED, an end of the peaked part corresponding to the LED, wherein the plate part covers the open portion, wherein the plate part includes a first portion inserted into the LED lens through the open portion and a second portion extending from the first portion to an outside of the LED lens, and the peaked part protrudes from the first portion of the plate part to be perpendicular to an extending direction of the second portion of the plate part, and wherein the plate part and the peaked part are integrated as one body;
   a diffusion plate spaced apart from the plurality of LED lamps, the diffusion plate having a light transmittance between about 50% and about 90%; and
   a plurality of optical sheets over the diffusion plate,
   wherein the dot reflecting sheet reflects light emitted from the LED toward the LED lens, and wherein the first portion of the plate part has a thickness greater than the second portion of the plate part, and wherein the light upwardly emitted from the LED is directly transmitted on the peaked part without passing through the LED lens.

2. The LED backlight assembly of claim 1, wherein the diffusion plate is made of materials comprising a transparent resin and dispersing agents.

3. The LED backlight assembly of claim 1, wherein the diffusion plate is spaced apart from the plurality of LED lamps at a distance greater than 3 mm.

4. The LED backlight assembly of claim 1, wherein the plurality of optical sheets includes a prism sheet and a diffusion sheet.

5. The LED backlight assembly of claim 4, wherein at least one of the plurality of optical sheets is spaced apart from the diffusion plate at a distance greater than 10 mm.

6. The LED backlight assembly of claim 1, wherein the respective LED lens is formed of a transparent material painted with a red, green or blue color.

7. The LED backlight assembly of claim 1, wherein the dot reflecting sheet has a white or silver color.

8. An LCD device, comprising:
   an LED backlight assembly, the backlight assembly including:
   a plurality of LED lamps;
   respective LED lamps including an LED surrounded by an LED lens, the LED lens having an open portion at a distal end thereof;
   a dot reflecting sheet including a plate part and a peaked part at a side facing the LED, an end of the peaked part corresponding to the LED, wherein the plate part covers the open portion, wherein the plate part includes a first portion inserted into the LED lens through the open portion and a second portion extending from the first portion to an outside of the LED lens, and the peaked part protrudes from the first portion of the plate part to be perpendicular to an extending direction of the second portion of the plate part, and wherein the plate part and the peaked part are integrated as one body;
   a diffusion plate spaced apart from the plurality of LED lamps, the diffusion plate having a light transmittance between about 50% and about 90%; and
   a plurality of optical sheets over the diffusion plate;
   a liquid crystal display panel over the plurality of optical sheets;
   a bottom cover covering a rear side of the LED backlight assembly;
   a reflecting sheet on an inner side of the bottom cover, the reflecting sheet having a plurality of through-holes corresponding to the plurality of LED lamps;
   a main cover interposed between the liquid crystal display panel and the LED backlight assembly and connected to the bottom cover; and
   a top cover covering a front side of the liquid crystal display panel and connected to the main cover,
   wherein the dot reflecting sheet reflects light emitted from the LED toward the LED lens, and wherein the first portion of the plate part has a thickness greater than the second portion of the plate part, and wherein the light upwardly emitted from the LED is directly transmitted on the peaked part without passing through the LED lens.

9. The LCD device of claim 8, further comprising a space in which the LED backlight assembly is disposed, wherein the space is defined by bar-type side supports disposed at opposite ends of the bottom cover along a first direction, and by opposite ends of the bottom cover along a second direction, wherein the opposite ends along the second direction are bent aslant in an upward direction.

10. The LCD device of claim 8, wherein the diffusion plate is made of materials comprising a transparent resin and dispersing agents.

11. The LCD device of claim 8, wherein the diffusion plate is spaced apart from the plurality of LED lamps at a distance of greater than 3 mm.

12. The LCD device of claim 8, wherein the plurality of optical sheets includes a prism sheet and a diffusion sheet and wherein at least one of the plurality of optical sheets is spaced apart from the diffusion plate at a distance of greater than 10 mm.

13. The LCD device of claim 8, wherein the respective LED lens is formed of a transparent material painted with a red, green or blue color.

14. A method of providing a planar light source to an LCD device comprising:
- providing a liquid crystal display device comprising a liquid crystal display panel;
- incorporating into the liquid crystal display device an LED backlight assembly including:
- a plurality of LED lamps;
- respective LED lamps including an LED surrounded by an LED lens, the LED lens having an open portion at a distal end thereof;
- a dot reflecting sheet including a plate part and a peaked part at a side facing the LED, an end of the peaked part corresponding to the LED, wherein the plate part covers the open portion, wherein the plate part includes a first portion inserted into the LED lens through the open portion and a second portion extending from the first portion to an outside of the LED lens, and the peaked part protrudes from the first portion of the plate part to be perpendicular to an extending direction of the second portion of the plate part, and wherein the plate part and the peaked part are integrated as one body;
- a diffusion plate spaced apart from the plurality of LED lamps, the diffusion plate having a light transmittance between about 50% and about 90%; and
- a plurality of optical sheets over the diffusion plate;
- a reflecting sheet having a plurality of through-holes corresponding to the plurality of LED lamps; and
- transmitting light emitted from the LED lamps or reflected from the reflecting sheet through the diffusion plate and the plurality of optical sheets to the liquid crystal display panel, wherein light transmitted from the plurality of LED lamps changes from a dot light source into a planar light source,
- wherein the dot reflecting sheet reflects light emitted from the LED toward the LED lens, and wherein the first portion of the plate part has a thickness greater than the second portion of the plate part, and wherein the light upwardly emitted from the LED is directly transmitted on the peaked part without passing through the LED lens.

15. The method of claim 14, wherein the diffusion plate is spaced apart from the LED lamps at a distance greater than 3 mm.

16. The method of claim 14, wherein the LED lens is formed of a transparent material painted with a red, green or blue color.

* * * * *